(12) United States Patent
Sundaram et al.

(10) Patent No.: US 7,672,323 B2
(45) Date of Patent: Mar. 2, 2010

(54) DYNAMIC AND INTELLIGENT BUFFER MANAGEMENT FOR SAN EXTENSION

(75) Inventors: Ganesh Sundaram, Rohnert Park, CA (US); John Diab, Santa Rosa, CA (US); Hitesh Amin, Petaluma, CA (US); Thomas Eric Ryle, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1247 days.

(21) Appl. No.: 11/036,596

(22) Filed: Jan. 14, 2005

(65) Prior Publication Data

US 2006/0159112 A1 Jul. 20, 2006

(51) Int. Cl.
 *H04L 12/28* (2006.01)
(52) U.S. Cl. .................. 370/412; 370/232; 370/401
(58) Field of Classification Search .......... 370/232, 370/401, 412
 See application file for complete search history.

(56) References Cited

U.S. PATENT DOCUMENTS

| | | | |
|---|---|---|---|
| 5,638,518 A | 6/1997 | Malladi | |
| 5,941,972 A | 8/1999 | Hoese et al. | |
| 5,959,994 A | 9/1999 | Boggs et al. | |
| 6,014,383 A | 1/2000 | McCarty | |
| 6,259,677 B1 | 7/2001 | Jain | |
| 6,278,718 B1 | 8/2001 | Eschholz | |
| 6,289,386 B1 | 9/2001 | Vangemert | |
| 6,356,944 B1 | 3/2002 | McCarty | |
| 6,393,489 B1 | 5/2002 | Sambamurthy et al. | |
| 6,400,730 B1 | 6/2002 | Latif et al. | |
| 6,636,529 B1 | 10/2003 | Goodman et al. | |
| 6,681,232 B1 * | 1/2004 | Sistanizadeh et al. | 707/104.1 |
| 6,779,083 B2 | 8/2004 | Ito et al. | |
| 6,816,462 B1 * | 11/2004 | Booth et al. | 370/248 |
| 2002/0004842 A1 | 1/2002 | Ghose et al. | |
| 2002/0055993 A1 | 5/2002 | Shah et al. | |
| 2002/0083190 A1 | 6/2002 | Kamiya et al. | |

(Continued)

FOREIGN PATENT DOCUMENTS

WO WO 01/43328 6/2001

OTHER PUBLICATIONS

Scholten et al., Data Transport Aplications Using GFP, May 2002, IEEE Communications Magazine, pp. 96-103.

(Continued)

*Primary Examiner*—Jason E Mattis (57) ABSTRACT

In a network system for transporting GFP-encapsulated Fibre Channel/FICON data across a SONET/SDH transport network between two Fibre Channel/FICON ports, a transport interface for one Fibre Channel/FICON port intelligently allocates the amount of buffers for receiving Fibre Channel/FICON data from the other Fibre Channel/FICON port by determining the latency of travel across the SONET/SDH transport network. The first transport interface inserts a special latency instruction message into the Fibre Channel/FICON data before encapsulation in a GFP frame. After transport across the SONET/SDH network, the receiving second transport interface immediately sends the special latency instruction message back across the SONET/SDH transport network to the first transport interface which times the return of the special latency instruction message. From the time interval, the first transport interface can determine the latency of the SONET/SDH transport network and allocates the amount of buffers appropriately. This latency determination procedure is performed periodically so that the amount of allocated buffers can change as the latency of the SONET/SDH transport network changes.

24 Claims, 5 Drawing Sheets

U.S. PATENT DOCUMENTS

| | | |
|---|---|---|
| 2002/0133629 A1 | 9/2002 | Jones et al. |
| 2002/0176450 A1 | 11/2002 | Kong et al. |
| 2002/0181494 A1 | 12/2002 | Rhee |
| 2003/0016683 A1 | 1/2003 | George et al. |
| 2003/0074449 A1 | 4/2003 | Smith et al. |
| 2003/0091037 A1 | 5/2003 | Latif et al. |
| 2003/0112833 A1 | 6/2003 | Kamiya |
| 2003/0126344 A1 | 7/2003 | Hodapp, Jr. |
| 2003/0185223 A1 | 10/2003 | Tate et al. |
| 2004/0076175 A1 | 4/2004 | Patenaude |
| 2004/0085902 A1* | 5/2004 | Miller et al. ............... 370/235 |
| 2004/0085904 A1 | 5/2004 | Bordogna et al. |
| 2004/0114924 A1* | 6/2004 | Holness et al. ............... 398/33 |
| 2005/0013313 A1* | 1/2005 | Liao et al. ................. 370/412 |
| 2005/0063307 A1 | 3/2005 | Samuels et al. |
| 2005/0089054 A1 | 4/2005 | Ciancaglini et al. |
| 2005/0108444 A1 | 5/2005 | Flauaus et al. |
| 2005/0117522 A1 | 6/2005 | Basavaiah et al. |
| 2005/0147121 A1 | 7/2005 | Burrell et al. |
| 2006/0010243 A1* | 1/2006 | DuRee ...................... 709/230 |
| 2006/0104212 A1* | 5/2006 | Lee ........................... 370/252 |

OTHER PUBLICATIONS

"Fibre Channel Switch Fabric (FX-SW) Rev. 3.3", NCITS Working Draft Proposed American National Standard for Information Technology, Oct. 21, 1997.

"Fibre Channel Switch Fabric—2 (FX-SW-2) Rev. 5.3", NCITS Working Draft Proposed American National Standard for Information Technology, Jun. 26, 2001.

"Fibre Channel Framing and Signaling, (FC-FS) Rev. 1.70", NCITS Working Draft Proposed American National Standard for Information Technology, Feb. 8, 2002.

* cited by examiner

DYNAMIC AND INTELLIGENT BUFFER MANAGEMENT FOR SAN EXTENSION

BACKGROUND OF THE INVENTION

The present invention relates generally to digital communication networks, and more specifically, to methods and systems for efficiently transporting Fibre Channel/FICON client data over a SONET/SDH network path.

SONET/SDH and optical fiber have emerged as significant technologies for building large scale, high speed, IP (Internet Protocol)-based networks. SONET, an acronym for Synchronous Optical Network, and SDH, an acronym for Synchronous Digital Hierarchy, are a set of related standards for synchronous data transmission over fiber optic networks. SONET/SDH is currently used in wide area networks (WAN) and metropolitan area networks (MAN). A SONET system consists of switches, multiplexers, and repeaters, all connected by fiber. The connection between a source and destination is called a path.

One network architecture for the network interconnection of computer devices is Fibre Channel, the core standard of which is described in ANSI (American National Standards Institute) X3.230-1994. Arising out of data storage requirements, Fibre Channel currently provides for bi-directional gigabits-per-second transport over Storage Area Networks (SANs) in Fibre Channel frames that consist of standardized sets of bits used to carry data over the network system. Fibre Channel links are limited to no more than 10 kilometers. Similar to Fibre Channel is FICON, a proprietary I/O channel which was developed by IBM for the data storage requirements for main frame computers.

New standards and protocols have emerged to combine the advantages of the SONET/SDH and Fibre Channel/FICON technologies. For example, it is sometimes desirable to link two SANs, which operate with Fibre Channel or FICON protocols, over a MAN (Metropolitan Area Network), or even a WAN (Wide Area Network), which typically operate under SONET or SDH standards. This extension of SANs from 100 kilometers to over several hundred, or even thousand, kilometers, is made by mapping Fibre Channel/FICON ports to a SONET/SDH path for transport across a SONET/SDH network. One way to perform this function is to encapsulate Fibre Channel/FICON client data frames into transparent Generic Framing Protocol (GFP-T) frames and then map the GFP-T frames into SONET/SDH frames for transport across the SONET/SDH network. In this manner two Fibre Channel/FICON ports can communicate with each other over a SONET/SDH network as though the intervening network links are part of a Fibre Channel/FICON network. The Fibre Channel/FICON ports remain "unaware" of the SONET/SDH transport path. For example, see U.S. patent application Ser. No. 10/390,813, entitled, "Method and System for Emulating a Fibre Channel Link Over a Sonet/SDH Path," filed Mar. 18, 2003 and assigned to the present assignee.

For the effective movement of data across SAN networks, these network systems have two types of flow control: 1) end-to-end, and 2) buffer-to-buffer credit. In both types of flow control, two Fibre Channel/FICON ports report to each other how many frames is available at the reporting port's buffer to receive Fibre Channel/FICON frames from the other port. In end-to-end flow control, the source and destination ports are the two ports and the ports signal each other the reception of a transmitted frame by an ACK Link Control frame. In buffer-to-buffer credit, the two ports on opposite sides of a link are the two ports and the ports communicate the reception of a transmitted frame with an R_Rdy Primitive signal. But flow control remains within the SAN network and is based on counting Fibre Channel/FICON frames which can vary. Flow control may also be extended across SONET/SDH transport networks which connect frame-based protocol networks, such as Fibre Channel/FICON and gigabit Ethernet. See, for example, U.S. patent application Ser. No. 10/613,426, entitled, "Method and System For Efficient Flow Control For Client Data Frames Over GFP Across a SONET/SDH Transport Path," filed Jul. 3, 2003 and assigned to the present assignee.

Nonetheless, for SAN extensions, i.e., interconnecting SANs by SONET/SDH transport networks, the SAN extension devices (the Fibre Channel/FICON ports communicating over a SONET/SDH network) usually provide a large amount of buffering in order to maintain a 100% throughput over very long distances. Because of the large number of buffers in the SAN extension devices, a great deal of latency can be created for the frames passing through the devices. It is possible that sometimes the latency introduced by extra buffering can be a significant portion of the total latency, even compared to the latency of the long distance communication.

The present invention addresses this problem of inappropriate buffering with buffer management which is dynamic and intelligently selective for the particular SAN extension.

SUMMARY OF THE INVENTION

The present invention provides for a method of operating a transport interface for at least one local Fibre Channel/FICON port, the transport interface having buffers for Fibre Channel/FICON data encapsulated in GFP frames transported over a SONET/SDH network from a remote Fibre Channel/FICON port. The method has the steps of inserting a special latency instruction message into Fibre Channel/FICON data to be encapsulated in a GFP frame for transmission to the remote Fibre Channel/FICON port; sending the GFP frame over the SONET/SDH transport network to the remote Fibre Channel/FICON port; timing a return of the special latency number over the said SONET/SDH transport network; determining an appropriate amount of buffers in the transport interface for GFP frames from the remote Fibre Channel/FICON port from the timing step; and allocating the appropriate amount of buffers in the transport interface for GFP frames from the remote Fibre Channel/FICON port; whereby sufficient buffering is ensured in the transport interface to provide maximum throughput over the SONET/SDH network and any additional latency due to buffering in the transport interface is reduced.

Furthermore, the inserting, sending, timing, determining and allocating steps are repeated periodically so that the amount of allocated buffers is adjusted even if the latency of GFP frames transported over said SONET/SDH network between the local and remote Fibre Channel/FICON ports changes. A period of about 1 second is used for the described embodiment of the present invention. The special latency instruction message, which is inserted in a Client Payload Information field of the Payload Area of the GFP frame, includes a latency sequence number to identify one sequence of inserting, sending, timing, determining and allocating steps from another sequence of inserting, sending, timing, determining and allocating steps; a special character encoded in a 4-bit mapping of the 64B/65B control characters as Fh; and a command to a transport interface for the remote Fibre Channel/FICON port to resend said special latency instruction message back to the transport interface for the at least one local Fibre Channel/FICON port upon receiving the special latency instruction message.

In a network system for transporting GFP-encapsulated Fibre Channel/FICON data across a SONET/SDH transport network between first and second Fibre Channel/FICON ports, the first Fibre Channel/FICON port connected to the SONET/SDH transport network through a first transport interface and the second Fibre Channel/FICON port connected to the SONET/SDH transport network through a second transport interface, the present invention also provides for the first transport interface which has at least one integrated circuit adapted to insert a special latency instruction message into Fibre Channel/FICON data from the first Fibre Channel/FICON port and to encapsulate the Fibre Channel/FICON data in a GFP frame, to send the GFP frame over the SONET/SDH transport network to the second transport interface of the second Fibre Channel/FICON port, to time a return of the special latency instruction message over the SONET/SDH transport network, to determine an appropriate amount of buffers in the first transport interface from a time interval of the special latency instruction message to return, and to allocate the appropriate amount of buffers in the first transport interface for GFP frames from the second Fibre Channel/FICON port so that sufficient buffering is ensured in the first transport interface to provide maximum throughput over the SONET/SDH network and any additional latency due to buffering in the transport interface is reduced.

The at least one integrated circuit is further adapted to insert the special latency instruction message, to encapsulate the Fibre Channel/FICON data in a GFP frame, to send the GFP frame, to time the return of the special latency instruction message, to determine the appropriate amount of buffers and to allocate the appropriate amount of buffers periodically so that the amount of allocated buffers is adjusted as the actual latency of GFP frames transported over the SONET/SDH network between the first and second Fibre Channel/FICON ports changes.

BRIEF DESCRIPTION OF THE DRAWINGS

Corresponding reference characters indicate corresponding parts throughout the several views of the drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
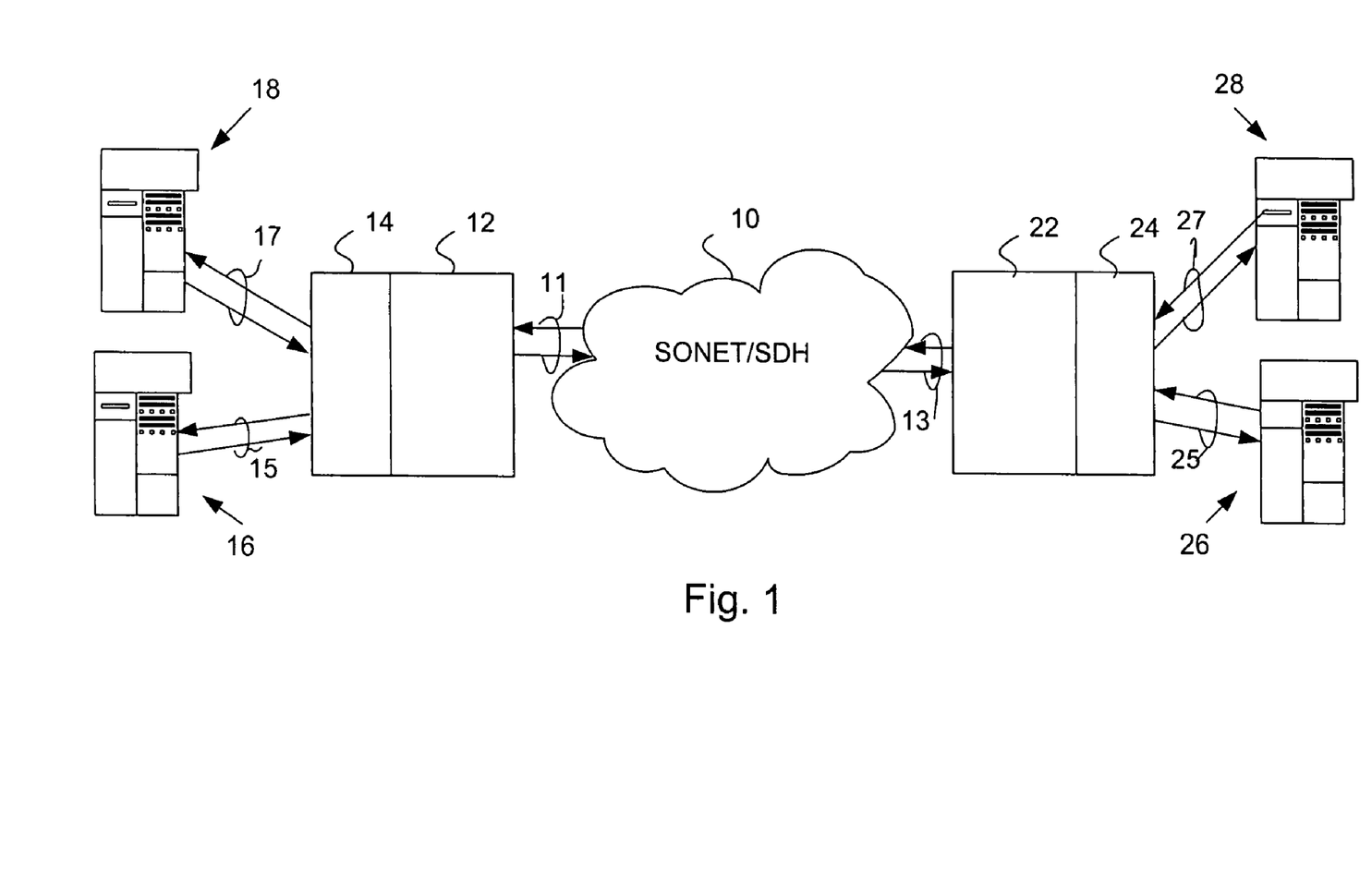
FIG. 1 is a diagram illustrating an exemplary network employing the present invention.

FIG. 1 illustrates an exemplary network of Fiber Channel/FICON ports are connected over a SONET/SDH transport network 10 in which an embodiment of the present invention can operate. In the present example, it is assumed that the ports operate under Fibre Channel or FICON protocols, though the ports may also operate under other frame-based protocols, such as gigabit Ethernet, in accordance with the present invention.

In the exemplary network Fibre Channel/FICON ports 16 and 18 are connected by Fibre Channel/FICON links 15 and 17 respectively to a multi-port Fibre Channel/FICON card 14. Likewise, a second Fibre Channel/FICON port card 24 is connected by Fibre Channel/FICON links 25 and 27 to Fibre Channel/FICON ports 26 and 28 respectively. The Fibre Channel/FICON ports 16, 18, 26 and 28 are associated with elements which are interconnected by Fibre Channel/FICON protocols in SANs. These elements include data storage elements, including disk drive arrays, RAIDs, disk farms, or possibly Fibre Channel network elements, such as routers, switches, or other Fibre Channel network elements. In FIG. 1 each Fibre Channel/FICON port card 14 and 24 is connected to a pair of Fibre Channel/FICON ports for purposes of illustration, and more ports may be connected to each Fibre Channel/FICON port card.

The SONET/SDH network 10 provides a transport path to connect the Fibre Channel/FICON ports 16 and 18 with the Fibre Channel ports 26 and 28 so that Fibre Channel/FICON client data can be transferred between the ports 16, 18 and 26, 28. Optical transport platforms 12 and 22, such as ONS 15454 (available from Cisco Systems, Inc. of San Jose, Calif.), provide the interface between the Fibre Channel/FICON and SONET/SDH networks. The Fibre Channel/FICON ports 16 and 18 are connected to the multi-port Fibre Channel/FICON card 14 which is adapted to fit into the optical transport platform 12; the Fibre Channel/FICON ports 26 and 28 are connected to the multi-port Fibre Channel/FICON card 24 which adapted to fit into the optical transport platform 22. Through the Fibre Channel/FICON port cards 14 and 24, which function as transport interfaces with the platforms 12 and 22 respectively, the Fibre Channel/FICON ports 16 and 18 are interconnected to the Fibre Channel/FICON ports 26 and 28 across the SONET/SDH network transport path. The result is that there are two virtual wires for the connection between a representative Fibre Channel/FICON port at one end of the SONET/SDH network 10, say, port 18, and a representative Fibre Channel port at the other end, say, port 28. As explained above, GFP-T, transparent Generic Framing Procedure, is conventionally used as the framing protocol for such a network to encapsulate the Fibre Channel/FICON payloads at one end of the SONET/SDH network 10 for transmission across the SONET/SDH network and to decapsulate the Fibre Channel/FICON data at the other end. By GFP-T protocol, the GFP-T frames have fixed lengths.

While the port cards 14 and 24 and their respective optical platforms 12 and 22 are the transport interfaces for the exemplary network of FIG. 1, the transport interfaces can be considered to be located in the port cards 14 and 24 for the described embodiment of the present invention. The cards 14 and 24 each have FIFO (First-In First-Out) buffers to hold the GFP frames received from the SONET/SDH transport network 10 before the encapsulated Fibre Channel/FICON frames of the described embodiment of the present invention, are stripped out of the GFP-encapsulation frames and passed on to their Fibre Channel port destinations.

The port cards 14 and 24, which extend the SANs so that they are interconnected, operate as intermediate transparent devices on a SAN network. Heretofore, such SAN extension devices typically have a configuration mechanism by which the user could select the number of FIFO buffers for the frames transported across the SONET/SDH network. The mechanism helps the user choose the number of buffers required for the SAN extension over a long distance and in order to maintain a 100% throughput over the long distances of SONET/SDH transport network 10, the mechanism typically selects a large amount of buffering usually provided in the SAN extension devices. However, a large amount of latency is added for the frames passing through the devices, because of the large number of buffers in the SAN extension devices.

These configuration mechanisms may not be accurate nor appropriate for the particular SONET/SDH transport path. Also, changes can occur in a transport network, e.g., an increased path delay because of a SONET/SDH switchover, thus changing the buffering requirements for the SAN extension devices.

To address these problems, the present invention accurately determines the round trip delay (a measure of distance) from one SAN extension device across a SONET/SDH transport network to another SAN extension device and back. Once the latency is accurately determined, the number of buffers required in the first SAN extension device is calculated and programmed into the hardware of the device. Since the number of required buffers are configured for the current distance between the two SAN extension devices, any additional latency due to extra buffering is avoided. Only the required number of buffers on the SAN extension devices is allocated to reduce latency. For example, 1 G (base clock rate of 1.0625 GHz for Fibre Channel/FICON data transfer) Fibre Channel/FICON client data sent over a 1200 Km (one-way) transport path requires 600 (2 Kbyte) buffers for a sustained 100% throughput. However, if the same 600 buffers are used for a 200 Km circuit, the extra 500 buffers add an unwanted latency of about 5 ms, thereby making the solution unsuitable for certain applications. Due to the inherent bursty nature of Fibre Channel/FICON traffic, the extra buffering can be filled with an additional 500 frames to add undesired latency. By limiting the number of buffers used, traffic is backpressured all the way to the Fibre Channel/FICON source and thereby reduces unwanted latency on all traffic.

It should be noted that although a 1 G Fibre Channel/FICON client operation speed is mentioned above, the present invention works effectively with Fibre Channel/FICON clients operating at 2G (double base clock rate or 2.125 GHz) or any other Fibre Channel/FICON speed.

Also, with the present invention any SONET/SDH switchover or protection event which leads to a new SONET/SDH path and new distance is automatically detected and the amount of buffers is adjusted accordingly. The buffer adjustments are performed without any hits or errors to the SAN traffic.

In accordance with the present invention, a special latency instruction message with an incrementing latency sequence number is periodically inserted into the GFP Client Payload Information field of the GFP-T frames encapsulating the Fibre Channel/FICON payload frames that are to be transported across SONET/SDH transport path. The special latency instruction message with latency sequence number includes a special K character that is not used in the Fibre Channel/FICON protocol and is never forwarded to the Fibre Channel/FICON client. It is only used between the Fibre Channel/FICON-Over-SONET/SDH equipment, such as the transport interfaces, i.e., the port cards 14 and 24, with the interconnecting SONET/SDH transport network 10 in the FIG. 1 network, for example. Upon sending the Fibre Channel/FICON frames encapsulated in the GFP frame with the special latency number, the local transport interface, i.e., the GFP transmitter, starts a timer.

At the remote or receiving transport interface, i.e., the GFP receiver, immediately responds to the special latency number by sending it back to the GFP transmitter across the SONET/SDH transport network.

Upon receiving the special latency instruction message and latency sequence number, the local transport interface reads its timer and has an accurate determination of the latency in sending frames across the SONET/SDH network to and from the GFP receiver. From the latency determination, the number of buffers required in the local transport interface, the port card 14 in this embodiment, is calculated and programmed into the hardware of the device. The local transport interface monitors the latency in the SONET/SDH transport path to the remote transport interface continually by repeating the procedure described above periodically. In the described embodiment this period is 1 second.

Figure 2A:
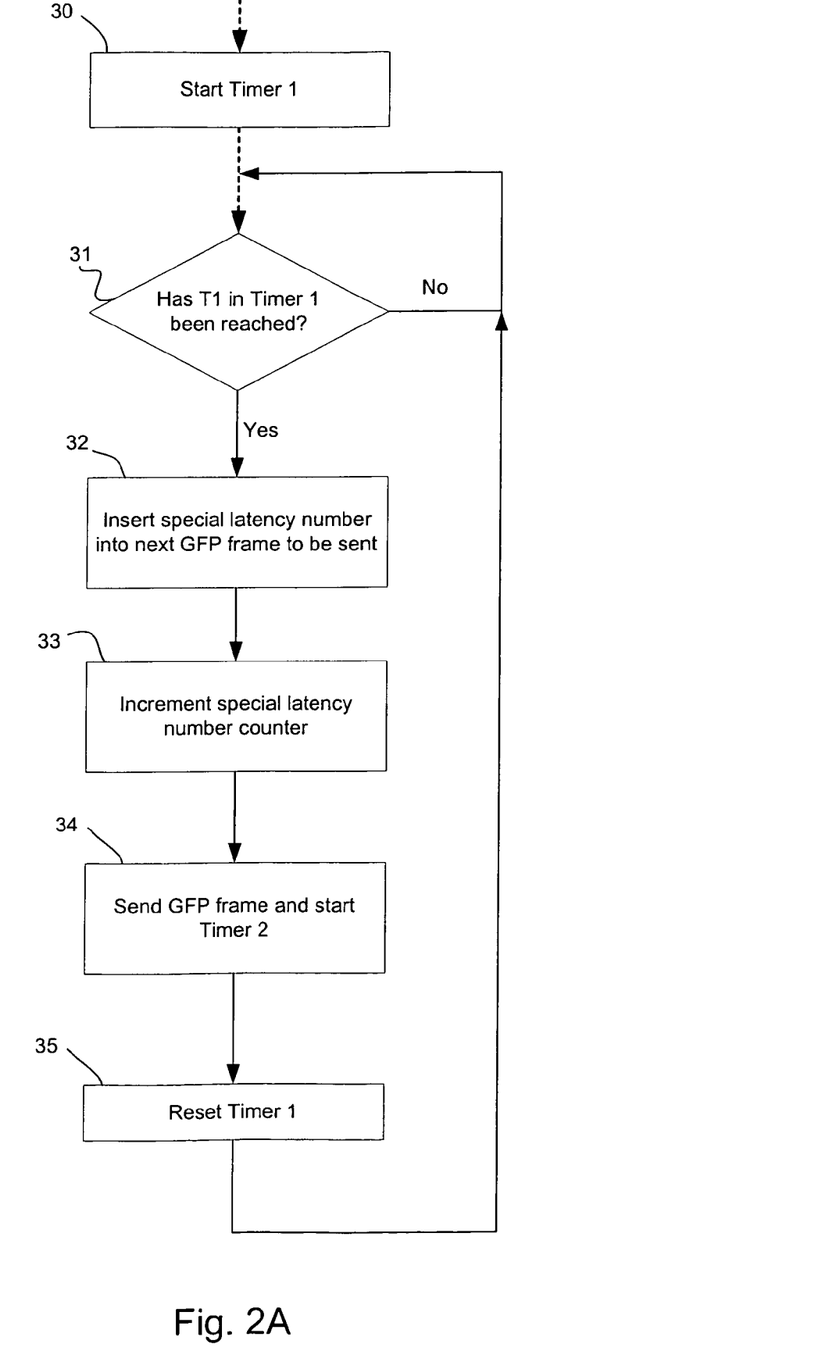
FIG. 2A is a flow chart of operations of a local transport interface, in the exemplary network of FIG. 1 in the transmission of a special latency instruction message to a remote transport interface, according to one embodiment of the present invention.
Figure 2B:
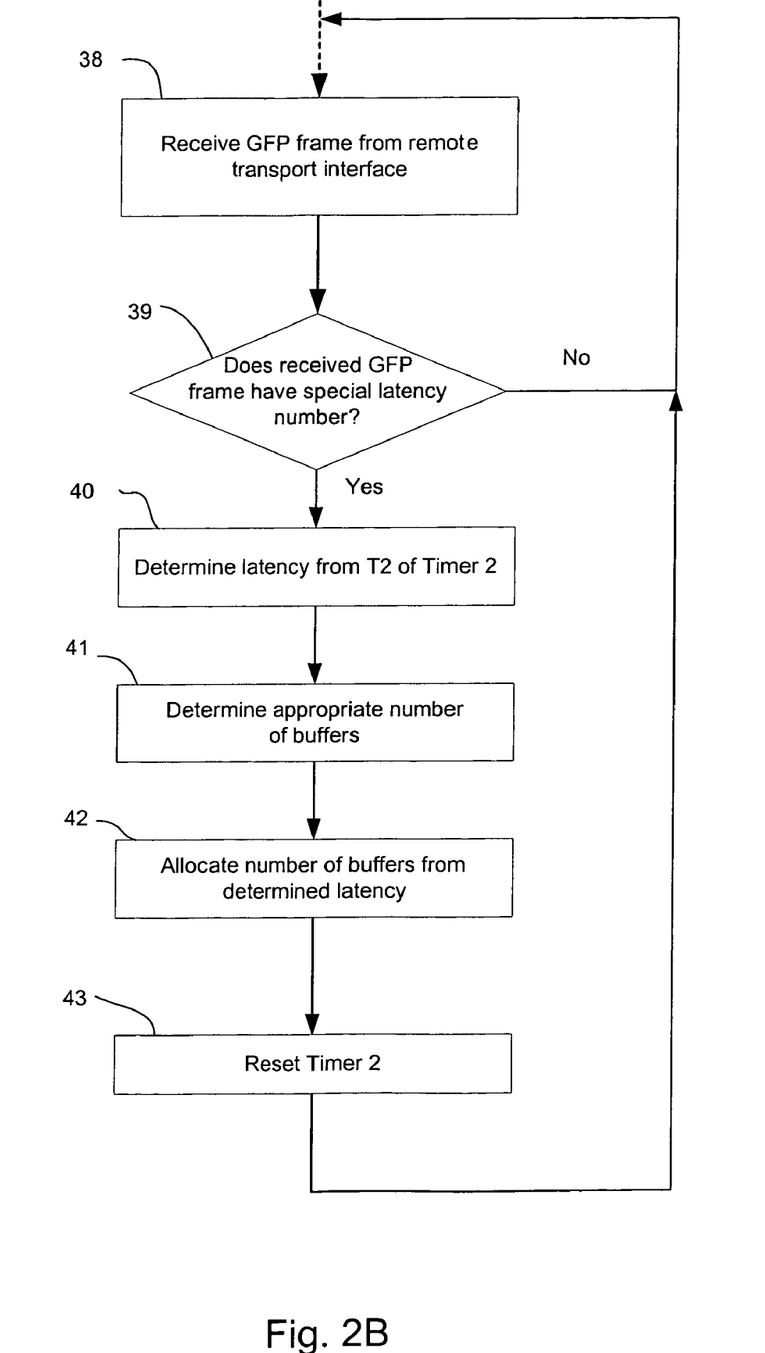
FIG. 2B is a flow chart of operations of the local transport interface after receiving a response from the remote transport interface.

FIGS. 2A and 2B are flow charts which illustrate the steps of operation of an exemplary local transport interface, the port card 14 in this case, in transmitting and receiving encapsulating GFP frames to and from a remote transport interface, the port card 24, in accordance with the present invention. In this manner the local and remote transport interfaces effectively extend their respective SANs to each other's SAN.

As shown in FIG. 2A, after the initialization of the local and remote transport interfaces and initial communication is established over the SONET/SDH transport path, as indicated by a dotted arrow, a Timer 1 in the port card 14 is started in step 30. After engaging in different operations not directly related to the present operations, the port card 14 reaches a decision step 31. Has the Timer 1 reached a value T 1, in this example, one second? If not, other operations between steps 30 and 31 not directly related to the present invention are resumed. For example, the transfer of GFP superblock frames may be resumed. If so, on the other hand, then a special latency sequence number from a special latency counter in the port card 14 is inserted into the next GFP frame by step 32. In step 33 the special latency counter is incremented and the GFP frame is sent by step 34 from the port card 14 to the port card 24 across the SONET/SDH transport network 10 and at the same time, the port card 14 also starts a Timer 2. In step 36 the Timer 1 is reset and the process returns back to the operations between steps 30 and 31.

Figure 3A:
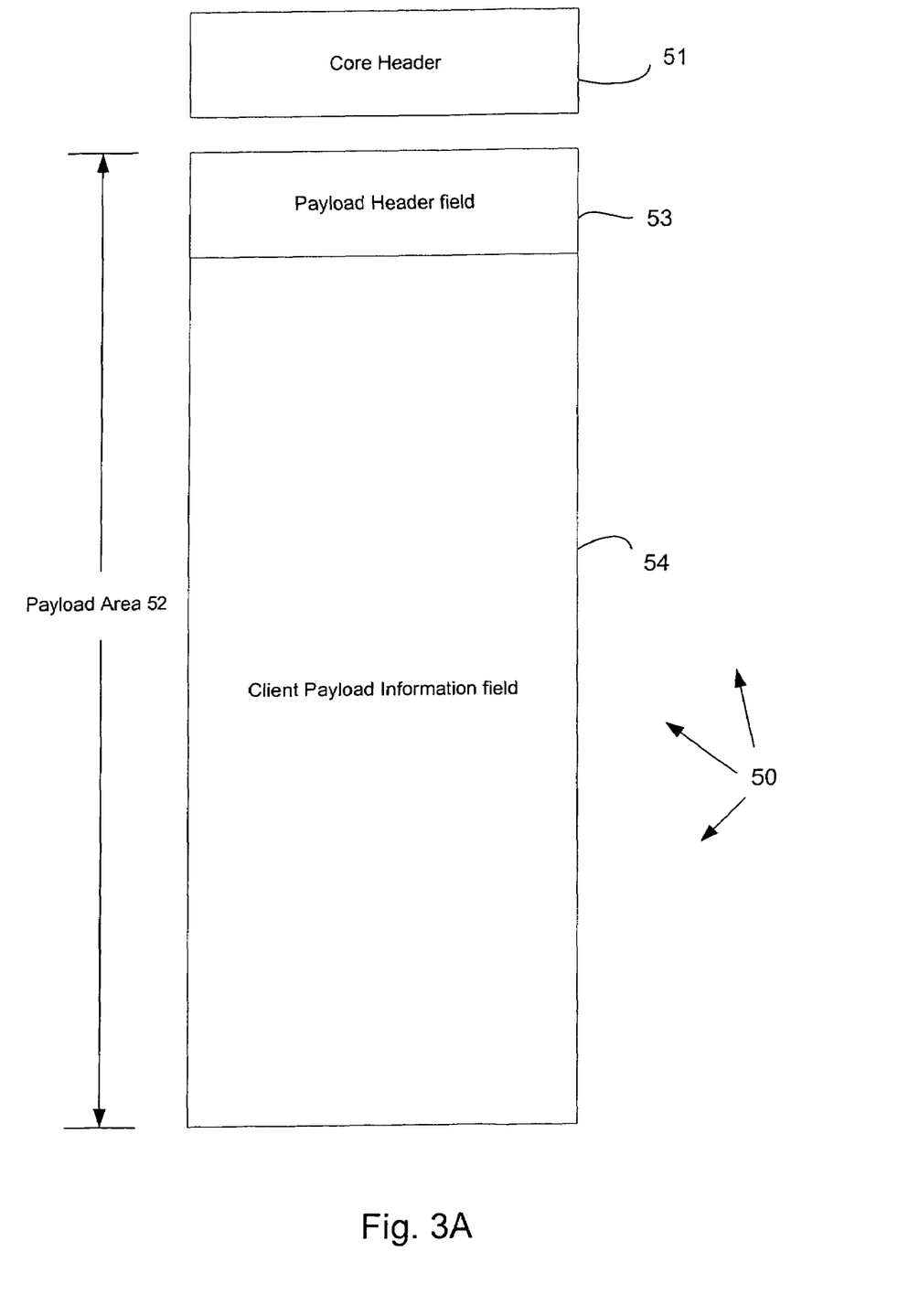
FIG. 3A is a representative diagram of a GFP frame.
Figure 3B:
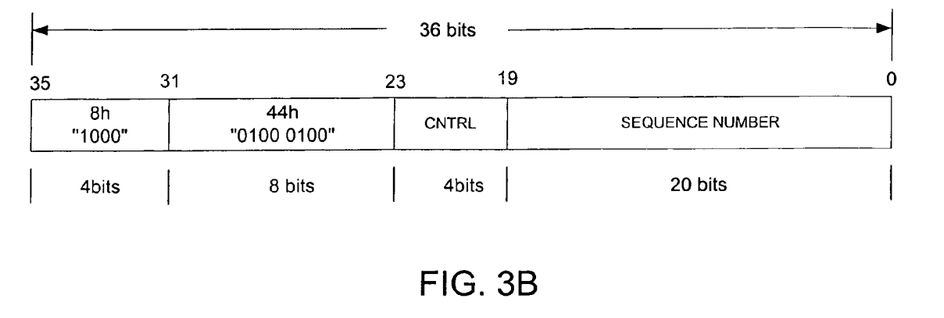
FIG. 3B illustrates the special latency instruction message with latency sequence number which is inserted into a GFP frame and sent by the local transport interface in FIG. 2A, according to one embodiment of the present invention.

FIG. 3A illustrates an exemplary GFP-T frame 50 with the special latency instruction message and latency sequence number which is assembled and sent by the local port card 14. The special instruction message and latency sequence number is placed in the GFP Client Payload Information field 54, such as found in the exemplary GFP frame 50 with its component Core Header 51 and Payload Area 52. Within the Payload Area 52 is a Payload Header field 53 and the Client Payload Information field 54. FIG. 3B illustrates the 36-bit special latency instruction message and latency sequence number which is inserted into the 10B/8B client data stream from the Fibre Channel/FICON port 18 at the Fibre Channel/FICON port card 14. In accordance with GFP-T procedures (see clause 8 of the ITU-T Generic Framing Procedure standard G.7041/Y.1303, for example), the decoded 10B/8B client data is mapped into 65B/64B block code and then into 65B/64B superblocks for placement into a GFP Client Payload Information field. In the special latency instruction message, the 4-bit "8h" (8 in hexadecimal) defines the data[31: 24] as a control word; the 8-bit "44h" within the control word is a special control character to the Fibre Channel/FICON receiving port card, the port card 24 in this example. The 20-bit incrementing latency sequence number identifies each latency determining operation. It should be noted that, as other Fibre Channel/FICON control characters, the special latency control character "44h" is encoded in a 4-bit mapping of 65B/64B control characters. The special latency control character is mapped as Fh ("1111"), with the associated command in the following 4 bits to instruct the receiving port card to send back the special latency instruction message and back over the SONET/SDH transport network to the initial transmitter port card.

Thus, across the SONET/SDH transport network 10, the remote port card 24 upon receipt of the GFP frame sent by the port card 14 by step 35, immediately sends a GFP frame with the special latency instruction message with its latency sequence number back across the SONET/SDH transport network 10 to the port card 14. Upon receiving the GFP frame in step 38 shown in FIG. 2B, the port card 14 determines by step 39 whether the GFP frame contains the special latency sequence number. If not, the process returns to handle the GFP frame as a transmission of data from the remote port card 24 to the local port card 14. If the GFP frame does have the special latency sequence number, then by step 40 T2 from Timer 2 indicates the time required for a GFP frame from the local port card 14 to traverse the SONET/SDH network 10 to the remote port card 24 and back again.

The appropriate number of buffers for transmission of GFP frames is calculated from T2 time interval in step 41 and in step 42 that number of buffers is allocated in the local port card 14 for the GFP frames from the transmitting port card 24. For a 100% throughput and a minimum transmission latency, it has been found that the allocation of a buffer of 2 Kbytes of memory for every 2 Km is effective. Thus as stated previously, for a determined time T corresponding to a 1200 Km one-way trip across the SONET/SDH transport network 10, it is determined that 600 buffers, each buffer having a memory capacity of 2 Kbytes, is appropriate. For a 200 Km circuit, 100 buffers are appropriate based on the speed of light and a maximum Fibre Channel/FICON frame size of 2148 bytes. This calculation in step 41 is straightforward to those skilled in the card and can be substituted with a simple look-up table. Finally, Timer 2 is reset to be restarted by step 35 shown in FIG. 2A.

The distances and hence the roundtrip time T2 may change with failovers in the SONET/SDH network 10. The individual links in the network 10 may change with various failures in the links of the network 10 and the path rerouted. To accommodate these changes, the Timer 1 assures that the local port card 14 constantly monitors the latency between the local port card 14 and the remote port card 24 with a period T1, one second in this embodiment. As the distance between the port cards 14 and 24 change, measured in roundtrip time, the appropriate number of buffers is continually evaluated and set in the local port card 14. In a similar fashion, the remote port 24 sets the appropriate number of buffers for GFP frames from the local port card 14.

Figure 4:
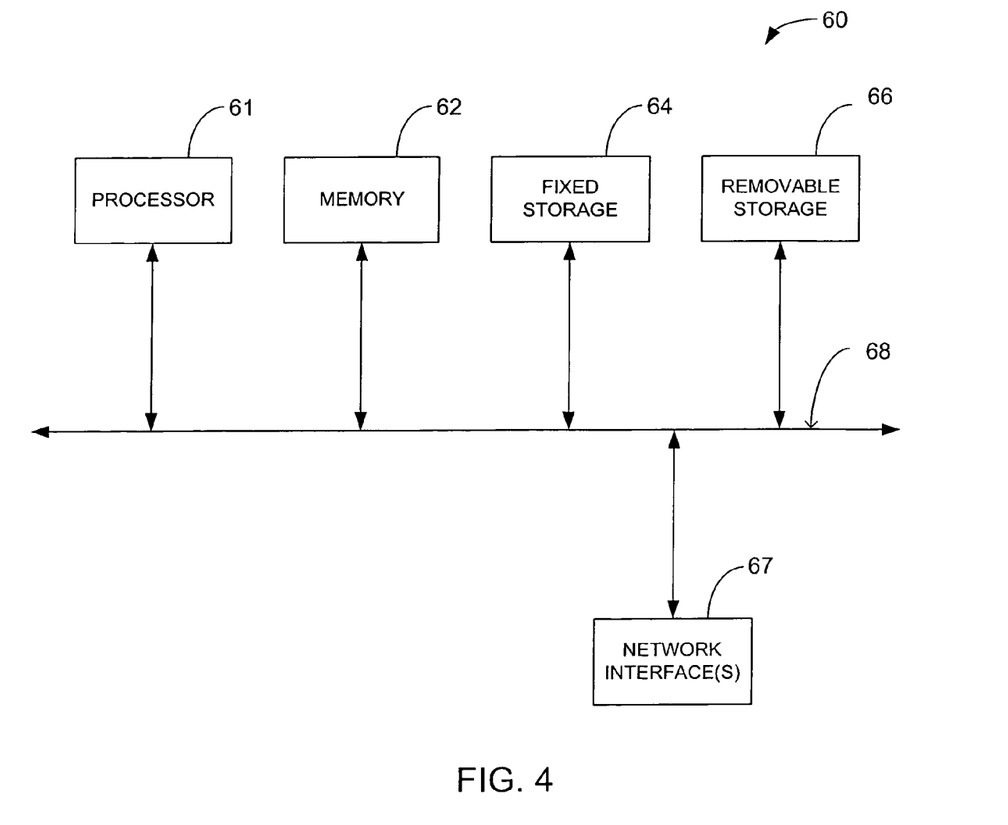
FIG. 4 is a block diagram of a portion of a port card of FIG. 1, according to one embodiment of the present invention.

The embodiment of the present invention described above is best implemented in the port cards 14 and 24 in the exemplary network of FIG. 1. The operations described above require a timer and counter, besides logic. A hardware implementation in an ASIC (Application Specific Integrated Circuit) or an FPGA (Field Programmable Gate Array) is preferred for a high-speed implementation of the present invention for optimal transmission of the client data frames across the SONET/SDH transport network.

Where throughput is not necessarily paramount, the present invention might be implemented in firmware, such as the ROM (Read-Only Memory) of a microcontroller, or in software which offers certain advantages. For instance, the processor unit instructed by the software might also perform operations other than those described, or upgrades can be made easily in software. FIG. 4 shows a block diagram of a representative computer system 60 that may be used to execute the software of an embodiment of the invention. The computer system 60 includes memory 62 which can store and retrieve software programs incorporating computer code that implements aspects of the invention, data for use with the invention, and the like. Exemplary computer readable storage media include CD-ROM, floppy disk, tape, flash memory, semiconductor system memory, and hard drive. The computer system 60 further includes subsystems such as a central processor 61, fixed storage 64 (e.g., hard drive), removable storage 66 (e.g., CD-ROM drive), and one or more network interfaces 67, all connected by a system bus 68. Other computer systems suitable for use with the invention may include additional or fewer subsystems. For example, computer system 60 may include more than one processor 61 (i.e., a multi-processor system) or a cache memory. The computer system 60 may also include a display, keyboard, and mouse (not shown) for use as a host.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. A method comprising:

receiving at a transport interface device Fibre Channel/FICON data from a local Fibre Channel/FICON port;

inserting a special latency instruction message into said Fibre Channel/FICON data comprising a control character field, a special control character field, and a latency sequence number, wherein said control character field indicates that said special control character field contains a special control character, encapsulating said Fibre Channel/FICON data in a generic framing procedure (GFP) client data frame;

sending said GFP client data frame over a SONET/SDH transport network to a remote Fibre Channel/FICON port;

starting a timer concurrently with said sending of said GFP frame for timing a return of said special latency instruction message over said SONET/SDH transport network to produce a round trip time;

calculating a number of buffers needed for receiving GFP client data frames from said remote Fibre Channel/FICON port in order to maximize throughput and reduce latency based on said round trip time; and allocating said number of buffers in said transport interface.

2. The method of claim 1 wherein inserting comprises inserting said special latency instruction message into said Fibre Channel/FICON data periodically, and further comprising:

adjusting said number of buffers when a new round trip time differs from said round trip time; and allocating said number of buffers in said transport interface based on said new round trip time.

3. The method of claim 2, wherein said inserting is repeated with a period of about 1 second.

4. The method of claim 1, wherein said special latency instruction message is inserted in a Client Payload Information field of a Payload Area of said GFP client data frame.

5. The method of claim 2, wherein said latency sequence number is incremented each time said special latency instruction message is inserted into said Fibre Channel/FICON data.

6. The method of claim 1, wherein said special latency instruction message further comprises a four bit special mapped control character, wherein said special control character is an eight bit control character that is mapped to said special mapped control character as a four bit 64b/65b control character.

7. The method of claim 1, wherein said special control character is configured to command a transport interface for said remote Fibre Channel/FICON port to resend said special latency instruction message back to said transport interface for said local Fibre Channel/FICON port upon receiving said special latency instruction message.

8. The method of claim 1, wherein said special control character is a special K character not defined for Fibre Channel/FICON protocols.

9. An apparatus comprising:
a first interface configured to receive Fibre Channel/FICON data from a local Fibre Channel/FICON port;
a second interface configured to send and receive generic framing procedure (GFP) client data frames;
a processor configured to:
receive Fibre Channel/FICON data from a local Fibre Channel/FICON port via said first interface;
insert a special latency instruction message into said Fibre Channel/FICON data comprising a control character field, a special control character field, and a latency sequence number, wherein said control character field indicates that said special control character field contains a special control character;
encapsulate said Fibre Channel/FICON data in a GFP client data frame;
send said GFP client data frame over a SONET/SDH transport network to a remote Fibre Channel/FICON port via said second interface;
start a timer concurrently with said sending of said GFP client data frame for timing a return of said special latency instruction message over said SONET/SDH transport network to produce a round trip time at said second interface;
calculate a number of buffers needed at said second interface for receiving GFP client data frames from said remote Fibre Channel/FICON port in order to maximize throughput and reduce latency based on said round trip time; and
allocate said number of buffers for said second interface.

10. The apparatus of claim 9, wherein said processor is configured to:
insert said special latency instruction message into said Fibre Channel/FICON data periodically;
adjust said number of buffers when a new round trip time differs from said round trip time; and
allocate said number of buffers for said second interface based on said new round trip time.

11. The apparatus of claim 10, wherein said processor is configured to insert said special latency instruction message into said Fibre Channel/FICON data with a period of approximately one second.

12. The apparatus of claim 9, wherein said processor is configured to insert said special latency instruction message into a Client Payload Information field of a Payload Area of said GFP client data frame.

13. The apparatus of claim 10, wherein said processor is further configured to increment said latency sequence number each time said special latency instruction message is inserted into said Fibre Channel/FICON data.

14. The apparatus of claim 9, wherein said processor is further configured to map said special control character into a special mapped control character in said special latency instruction message, wherein said special control character is an eight bit control character that is mapped to said special mapped control character as a four bit 64b/65b control character.

15. The apparatus of claim 9, wherein said processor is further configured to insert said special control character that is configured to command a transport interface for said remote Fibre Channel/FICON port to resend said special latency instruction message back to said second interface upon receiving said special latency instruction message.

16. The apparatus of claim 9, wherein said processor is further configured to insert said special control character as a special K character not defined for Fibre Channel/FICON protocols.

17. A processor readable tangible medium encoded with instructions that, when executed by a processor, cause the processor to:
receive Fibre Channel/FICON data from a local Fibre Channel/FICON port via a first interface;
insert a special latency instruction message into said Fibre Channel/FICON data comprising a control character field, a special control character field, and a latency sequence number, wherein said control character field indicates that said special control character field contains a special control character;
encapsulate said Fibre Channel/FICON data in a GFP client data frame;
send said GFP client data frame over a SONET/SDH transport network to a remote Fibre Channel/FICON port via a second interface;
start a timer concurrently with said sending of said GFP client data frame for timing a return of said special latency instruction message over said SONET/SDH transport network to produce a round trip time at said second interface;
calculate a number of buffers needed at said second interface for receiving GFP client data frames from said remote Fibre Channel/FICON port in order to maximize throughput and reduce latency based on said round trip time; and
allocate said number of buffers for said second interface.

18. The processor readable tangible medium of claim 17, wherein said instructions that insert said special latency instruction message comprise instructions that cause said processor to insert said special latency instruction message into said Fibre Channel/FICON data periodically,
and wherein said instructions that adjust said number of buffers comprise instructions that cause said processor to adjust said number of buffers when a new round trip time differs from said round trip time,
and wherein said instructions that allocate said number of buffers comprise instructions that cause said processor to allocate said number of buffers based on said new round trip time.

19. The processor readable tangible medium of claim 18, wherein said instructions that insert said special latency instruction message comprise instructions that cause said processor to insert said special latency instruction message into said Fibre Channel/FICON data with a period of approximately one second.

20. The processor readable tangible medium of claim 17, wherein said instructions that insert said special latency instruction message comprise instructions that cause said processor to insert said special latency instruction message into a Client Payload Information field of a Payload Area of said GFP client data frame.

21. The processor readable tangible medium of claim 18, further encoded with instructions that, when executed by a processor, cause the processor to increment said latency sequence number each time said special latency instruction message is inserted into said Fibre Channel/FICON data.

22. The processor readable tangible medium of claim 17, further encoded with instructions that, when executed by a processor, cause the processor to map said special control character into a special mapped control character in said special latency instruction message, wherein said special control character is an eight bit control character that is mapped to said special mapped control character as a four bit 64b/65b control character.

23. The processor readable tangible medium of claim 17, wherein said instructions that insert said special latency instruction message comprise instructions that cause said processor to insert said special control character that is configured to command a transport interface for said remote Fibre Channel/FICON port to resend said special latency instruction message back to said second interface upon receiving said special latency instruction message.

24. The processor readable tangible medium of claim 17, wherein said instructions that insert said special control character comprise instructions that cause said processor to insert said special control character as a special K character not defined for Fibre Channel/FICON protocols.

\* \* \* \* \*